(12) United States Patent
Onuki et al.

(10) Patent No.: US 12,026,931 B2
(45) Date of Patent: Jul. 2, 2024

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Hiroko Onuki, Kanagawa (JP); Takashi Hiramatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 408 days.

(21) Appl. No.: 17/374,025

(22) Filed: Jul. 13, 2021

(65) Prior Publication Data

US 2022/0277168 A1 Sep. 1, 2022

(30) Foreign Application Priority Data

Feb. 26, 2021 (JP) .................................. 2021-030590

(51) Int. Cl.
*G06V 10/60* (2022.01)
*G06T 7/73* (2017.01)
*G06V 20/20* (2022.01)
*H04N 23/69* (2023.01)

(52) U.S. Cl.
CPC ................ *G06V 10/60* (2022.01); *G06T 7/73* (2017.01); *G06V 20/20* (2022.01); *H04N 23/69* (2023.01)

(58) Field of Classification Search
CPC ........ G06V 20/20; G06V 10/60; G06V 20/80; G06T 7/73; G06T 7/77; G06T 7/0004; G06T 7/70; G06T 1/0014; G06T 2207/30108; H04N 23/69
See application file for complete search history.

(56) References Cited

U.S. PATENT DOCUMENTS

2007/0226258 A1* 9/2007 Lambdin ................. G02B 23/26
2017/0017840 A1* 1/2017 Higa .................... G06F 16/5838

FOREIGN PATENT DOCUMENTS

JP 2012-156793 A 8/2012

* cited by examiner

*Primary Examiner* — Margaret G Mastrodonato
(74) *Attorney, Agent, or Firm* — Oliff PLC

(57) ABSTRACT

An information processing apparatus includes a processor configured to: acquire positional information indicating a position of a portion of an article; acquire condition information indicating a condition of the portion of the article; and store the positional information and the condition information in association with each other.

14 Claims, 14 Drawing Sheets

FIG. 11

| OVERALL IMAGE | POSITIONAL INFORMATION | PARTIAL IMAGE | MEASURED VALUES |
|---|---|---|---|
| P1 | (X11,Y11) | Q11 | G:2.5, L1.0, B:1.4; |
| | (X12,Y12) | Q12 | G:3.0, L1.3, B:1.8; Δ3.0 |
| | (X13,Y13) | Q13 | G:3.5, L1.5, B:1.9; Δ5.0 |
| P2 | ... | ... | ... |
| | ... | ... | ... |
| ⋮ | ⋮ | ⋮ | ⋮ |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-030590 filed Feb. 26, 2021.

BACKGROUND

(i) Technical Field

The present disclosure relates to an information processing apparatus and a non-transitory computer readable medium storing a program.

(ii) Related Art

Japanese Unexamined Patent Application Publication No. 2012-156793 describes the following information terminal. In response to a user's operation for specifying a certain position (position specifying operation) by, for example, tapping an image displayed on a touchscreen (link originating image), a specified information acquirer acquires positional information on the specified position. A link controller generates link information including data identification information on the link originating image, the positional information, and data identification information on a new camera image obtained by the user. A storage stores the link information.

SUMMARY

Aspects of non-limiting embodiments of the present disclosure relate to, for example, a case where conditions of portions of an article are managed for improvement in the conditions. For example, images showing the portions of the article may randomly be listed for management. However, this method makes it difficult to grasp which position on the article is associated with the condition of a specific portion.

It is appropriate to grasp which position on the article is associated with the condition of a specific portion more easily than in the method involving randomly listing the images showing the portions of the article.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus comprising a processor configured to: acquire positional information indicating a position of a portion of an article; acquire condition information indicating a condition of the portion of the article; and store the positional information and the condition information in association with each other.

BRIEF DESCRIPTION OF THE DRAWINGS

An exemplary embodiment of the present disclosure will be described in detail based on the following figures, wherein:

FIG. 11 illustrates an example of associated information stored in an associated information storage of the appearance inspection apparatus according to the exemplary embodiment of the present disclosure;

DETAILED DESCRIPTION

An exemplary embodiment of the present disclosure is described below in detail with reference to the accompanying drawings.

Overview of Exemplary Embodiment

This exemplary embodiment provides an information processing apparatus that acquires positional information indicating a position of a portion of an article, acquires condition information indicating a condition of the portion of the article, and stores the positional information and the condition information in association with each other.

The position of the portion of the article may be specified on an overall image of the article. In this case, the position of the portion of the article may be specified by selecting the position on the overall image displayed on a display. The operation of the information processing apparatus in this case is hereinafter referred to as "first operation". The position of the portion of the article may be specified by zooming on the position with an imaging device shooting the overall image. The operation of the information processing apparatus in this case is hereinafter referred to as "second operation".

The information processing apparatus may display the position of the portion of the article on the overall image of the article after acquisition of the positional information. The operation of the information processing apparatus in this case is hereinafter referred to as "third operation".

The condition information may be a text or a measurement result (measured value) related to the condition of each portion of the article. The measured value is described below as an example of the condition information.

The information processing apparatus may be used for any purpose. Examples of the information processing apparatus include an appearance inspection apparatus that inspects an appearance of an article, and an apparatus that displays an image of the entire product and a condition of a portion of the product in association with each other in the sales of products in electronic commerce. The appearance inspection apparatus is described below as an example of the information processing apparatus. The appearance inspection apparatus may inspect an appearance of the entire product, but herein inspects an appearance of a component of the product.

[Overall Configuration of Appearance Inspection System]

Figure 1:
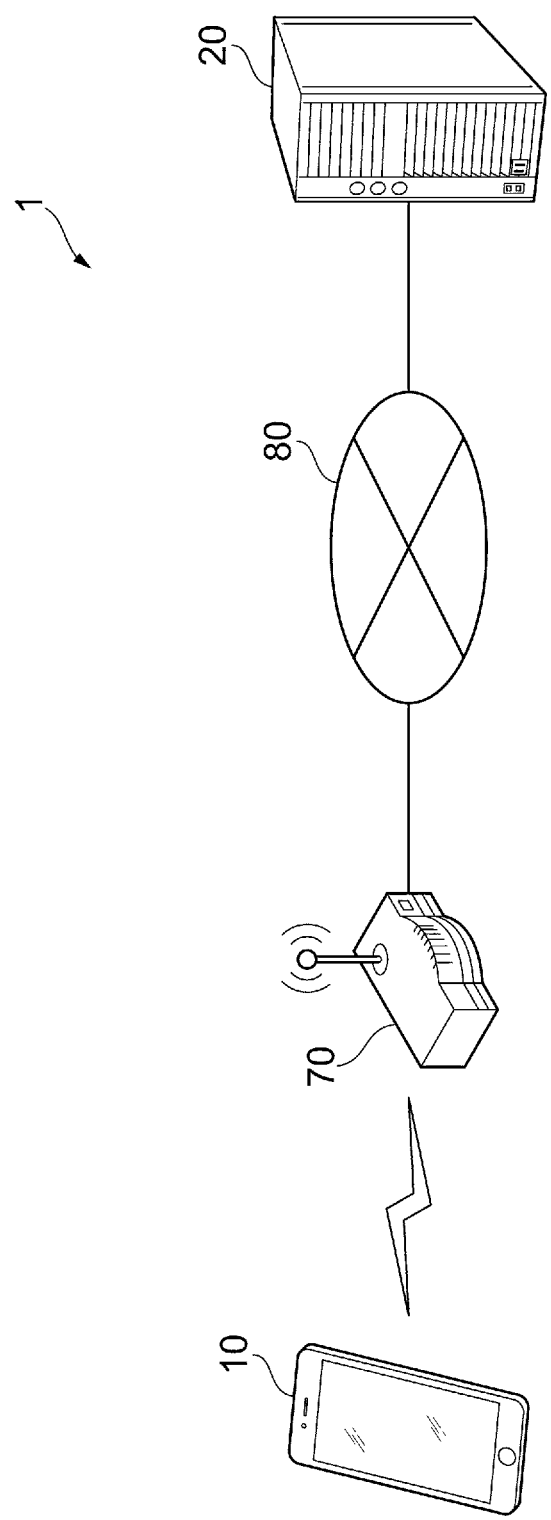
FIG. 1 illustrates an example of the overall configuration of an appearance inspection system according to an exemplary embodiment of the present disclosure.

FIG. 1 illustrates an example of the overall configuration of an appearance inspection system 1 according to this exemplary embodiment. As illustrated in FIG. 1, the appearance inspection system 1 includes a mobile terminal 10 and an appearance inspection apparatus 20. The mobile terminal 10 is wirelessly connectable to a communication network 80 via an access point 70 by, for example, wireless communication using Wi-Fi (registered trademark). The appearance inspection apparatus 20 is connected to the communication network 80. Although FIG. 1 illustrates one mobile terminal 10 and one appearance inspection apparatus 20, the number of mobile terminals 10 or appearance inspection apparatuses 20 may be plural. Examples of the communication network 80 include the Internet.

The mobile terminal 10 is a terminal apparatus to be used by a user of the appearance inspection system 1 to inspect an appearance of a component. A camera application is installed in the mobile terminal 10. For example, the camera application acquires an image of the component by shooting the component in response to an operation of an operator of the mobile terminal 10. The mobile terminal 10 transmits the image of the component to the appearance inspection apparatus 20 by, for example, wireless communication using Wi-Fi (registered trademark). Examples of the mobile terminal 10 include a smartphone. In this exemplary embodiment, the mobile terminal 10 is an example of the display. In this exemplary embodiment, the mobile terminal 10 is also an example of the imaging device.

The appearance inspection apparatus 20 inspects the appearance of the component based on the image of the component received from the mobile terminal 10. The appearance inspection is herein inspection as to whether gloss, lightness, and irregularities on the surface of the component fall within permissible ranges of their reference values or whether the component has variations at any part. In this exemplary embodiment, the appearance inspection apparatus 20 is an example of the information processing apparatus.

[Hardware Configuration of Mobile Terminal]

Figure 2:
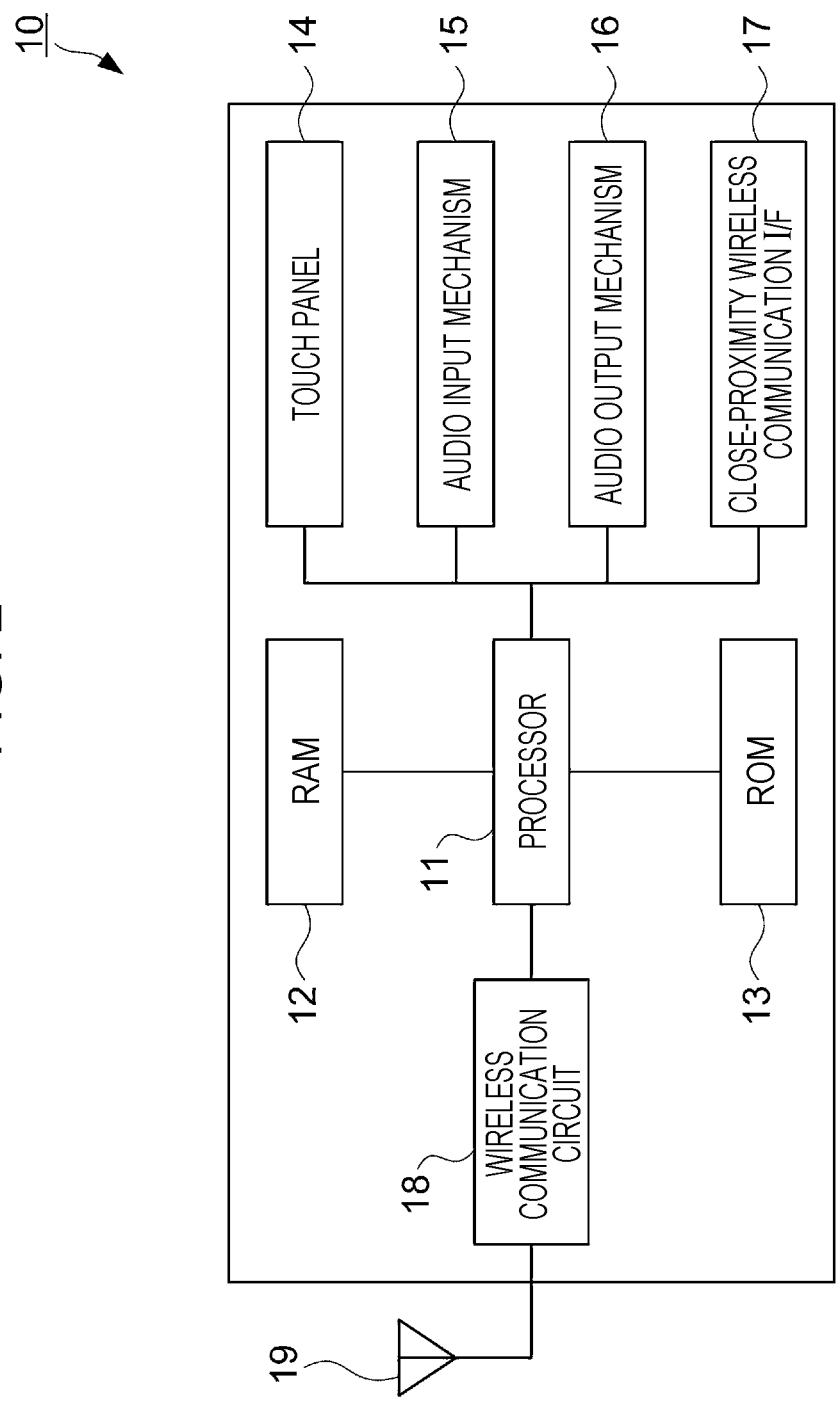
FIG. 2 illustrates an example of the hardware configuration of a mobile terminal according to the exemplary embodiment of the present disclosure.

FIG. 2 illustrates an example of the hardware configuration of the mobile terminal 10 according to this exemplary embodiment. As illustrated in FIG. 2, the mobile terminal 10 includes a processor 11, a RAM 12 and a ROM 13 serving as a storage, a touch panel 14 that displays various types of information and receives user's operations, an audio input mechanism 15 such as a microphone, an audio output mechanism 16 such as a loudspeaker, and a close-proximity wireless communication interface (I/F) 17 that exchanges various types of information with other apparatuses by close-proximity wireless communication such as near field communication (NFC). The mobile terminal 10 further includes a wireless communication circuit 18 and an antenna 19 for wireless communication via base stations. The wireless communication circuit 18 includes a baseband LSI (not illustrated) that processes digital data signals exchanged by wireless.

[Hardware Configuration of Appearance Inspection Apparatus]

Figure 3:
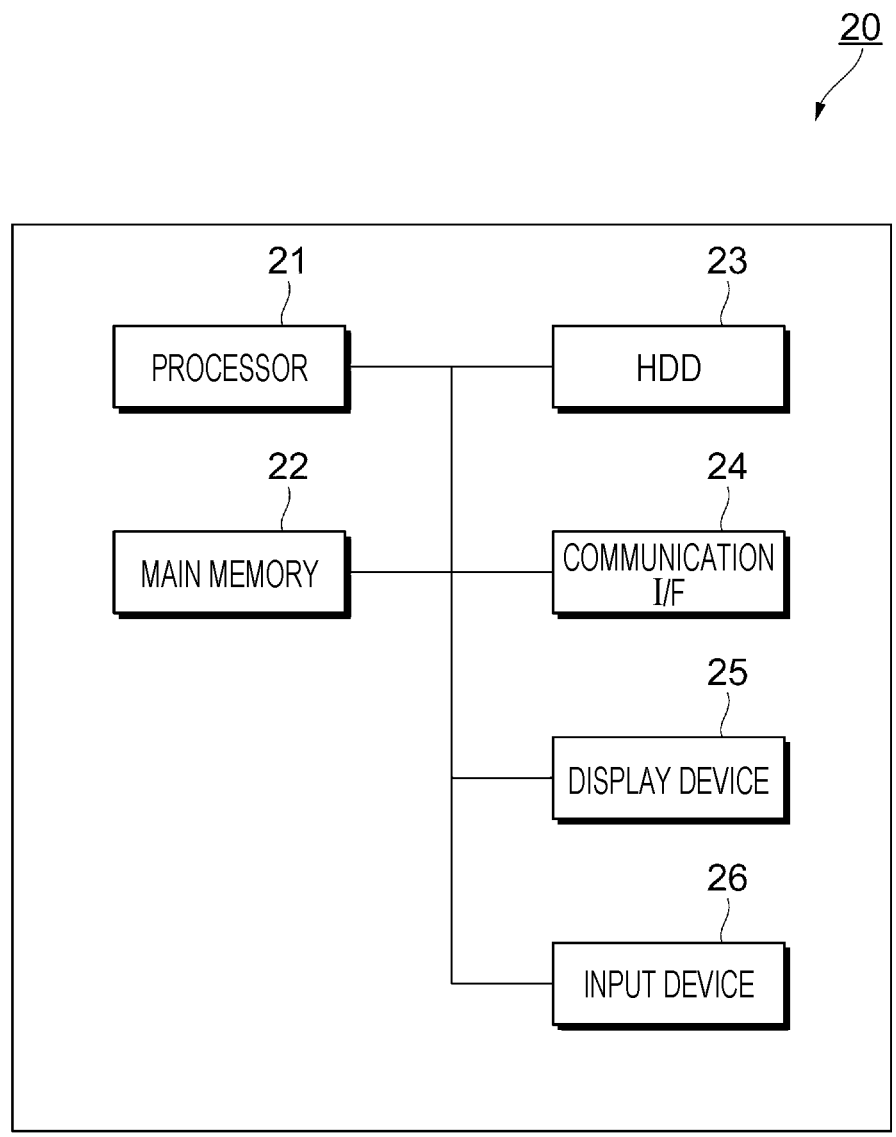
FIG. 3 illustrates an example of the hardware configuration of an appearance inspection apparatus according to the exemplary embodiment of the present disclosure.

FIG. 3 illustrates an example of the hardware configuration of the appearance inspection apparatus 20 according to this exemplary embodiment. As illustrated in FIG. 3, the appearance inspection apparatus 20 includes a processor 21, a main memory 22, and a hard disk drive (HDD) 23. The processor 21 implements functions described later by executing various types of software such as an operating system (OS) and applications. The main memory 22 is a storage area that stores various types of software and data for use in execution of the software. The HDD 23 is a storage area that stores input and output data for various types of software. The appearance inspection apparatus 20 further includes a communication interface (I/F) 24 for external communication, a display device 25, and an input device 26 such as a keyboard and a mouse.

Specific Example of Exemplary Embodiment

A specific example of this exemplary embodiment is described based on transition of screens to be displayed on the touch panel 14 of the mobile terminal 10. The specific example is directed to a case where the appearance inspection apparatus 20 performs the first operation.

Figure 4:
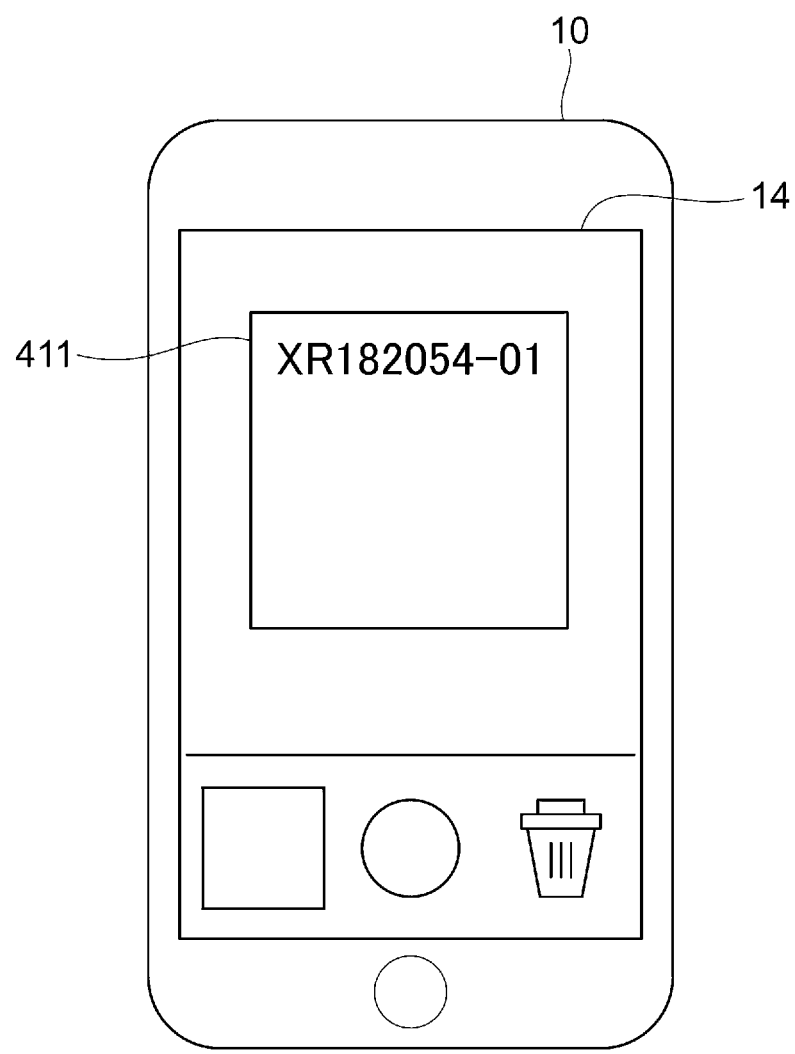
FIG. 4 illustrates an example of a screen displayed on a touch panel of the mobile terminal when shooting a component number of a measurement target component.

FIG. 4 illustrates an example of a screen displayed on the touch panel 14 of the mobile terminal 10 when shooting a component number of a measurement target component. As illustrated in FIG. 4, the screen displays a component number image 411 obtained by shooting the component number.

In response to acquisition of the component number image 411, the mobile terminal 10 transmits the component number image 411 to the appearance inspection apparatus 20. The appearance inspection apparatus 20 acquires an overall image of the measurement target component based on the component number image 411, and transmits the overall image to the mobile terminal 10.

Figure 5:
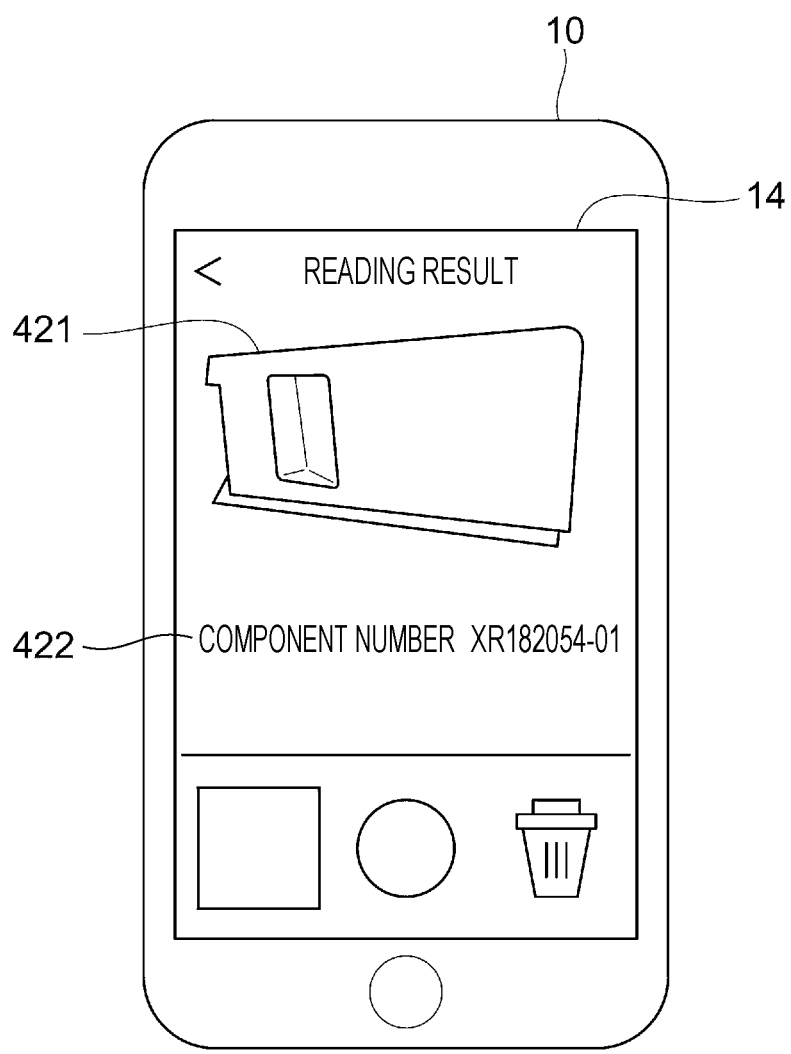
FIG. 5 illustrates an example of a screen displayed on the touch panel of the mobile terminal in response to reception of an overall image of the measurement target component from the appearance inspection apparatus.

FIG. 5 illustrates an example of a screen displayed on the touch panel 14 of the mobile terminal 10 in response to reception of the overall image of the measurement target component from the appearance inspection apparatus 20. As illustrated in FIG. 5, the screen displays an overall image 421 of the measurement target component and a component number description 422 indicating the component number.

Figure 6:
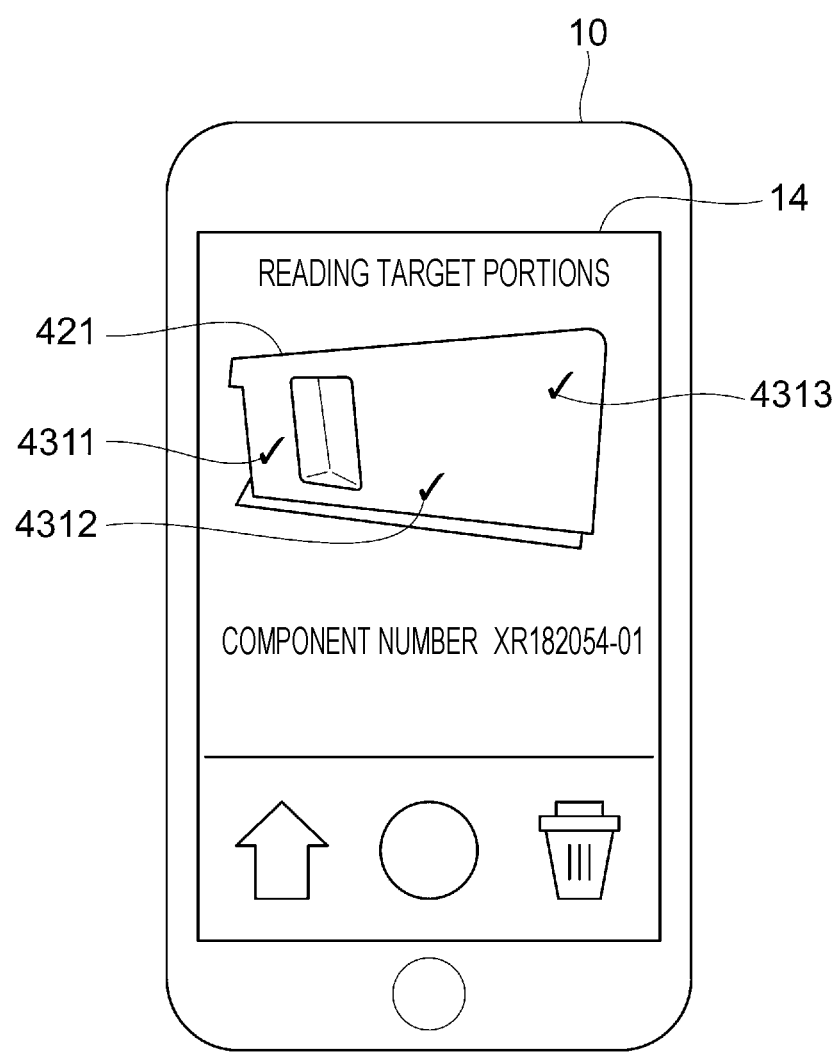
FIG. 6 illustrates an example of a screen displayed on the touch panel of the mobile terminal in response to user's selection of measurement target portions on the overall image.

FIG. 6 illustrates an example of a screen displayed on the touch panel 14 of the mobile terminal 10 in response to user's selection of measurement target portions on the overall image 421. For example, the user selects measurement target portions of the component on the overall image 421 by pointing. As illustrated in FIG. 6, marks 4311 to 4313 indicating the measurement target portions are displayed on the overall image 421. The measurement target portions indicated by the marks 4311 to 4313 are hereinafter referred to as "measurement target portions #1 to #3", respectively.

The user activates the camera application on the mobile terminal 10 and shoots the measurement target portions #1 to #3 by sequentially focusing on the marks 4311 to 4313 in FIG. 6. The measurement target portions #1 to #3 may be shot while displaying the overall image 421 with the marks 4311 to 4313. When the user shoots the measurement target portions #1 to #3, the mobile terminal 10 acquires partial images of the measurement target portions #1 to #3, and transmits the partial images to the appearance inspection apparatus 20. The appearance inspection apparatus 20 performs measurement based on the partial images, and transmits measured values to the mobile terminal 10.

Figure 7:
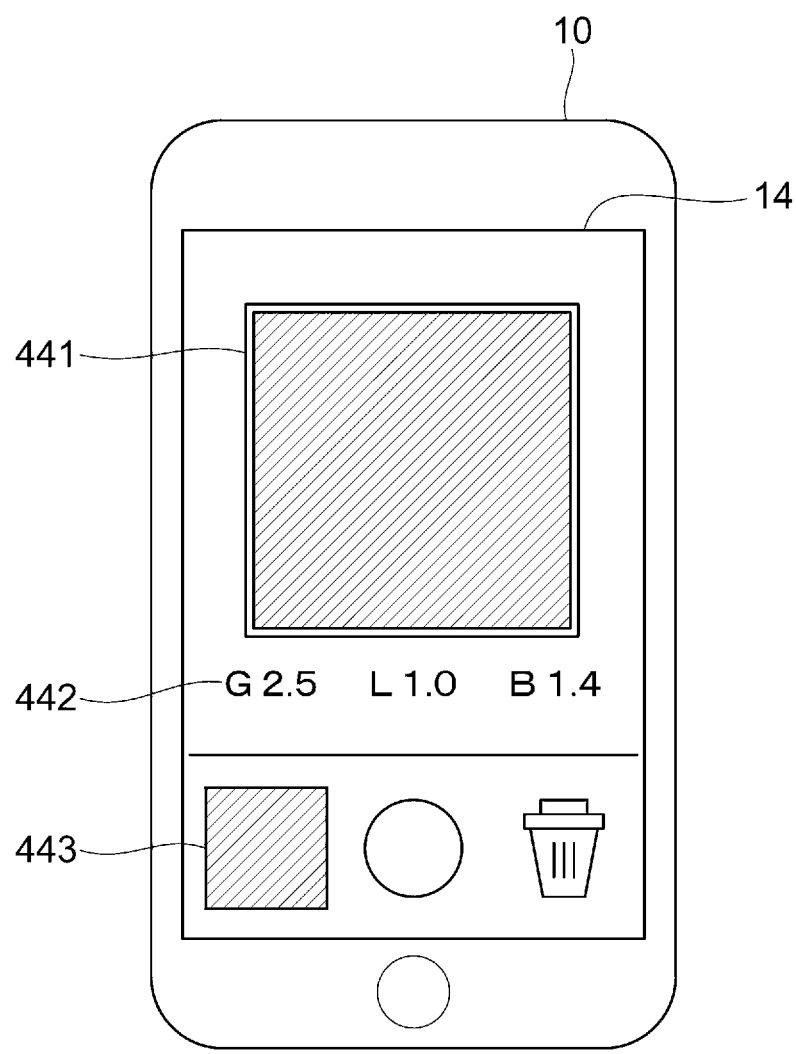
FIG. 7 illustrates an example of a screen displayed on the touch panel of the mobile terminal when the user refers to reference information for measured values of the component.

FIG. 7 illustrates an example of a screen displayed on the touch panel 14 of the mobile terminal 10 when the user refers to reference information for the measured values of the component. As illustrated in FIG. 7, the screen displays a reference image 441 and a reference value description 442. The reference image 441 shows a condition of a measurement target portion of the component when the measured values are equal to reference values, that is, an ideal condition of the measurement target portion. The reference value description 442 indicates the reference values. In the reference value description 442, the symbol "G" represents an index of gloss, which is a difference between a specular reflection image brightness and a diffuse reflection image brightness. The symbol "L" represents an index of lightness, which is a brightness of a grayscaled diffuse reflection image. The symbol "B" represents an index of irregularities, which is a visual frequency integrated value of the specular reflection image brightness. The screen also displays a reference image 443. The reference image 443 is identical to the reference image 441, and is displayed for comparison with the partial images of the measurement target portions in FIG. 8 or the like.

Figure 8:
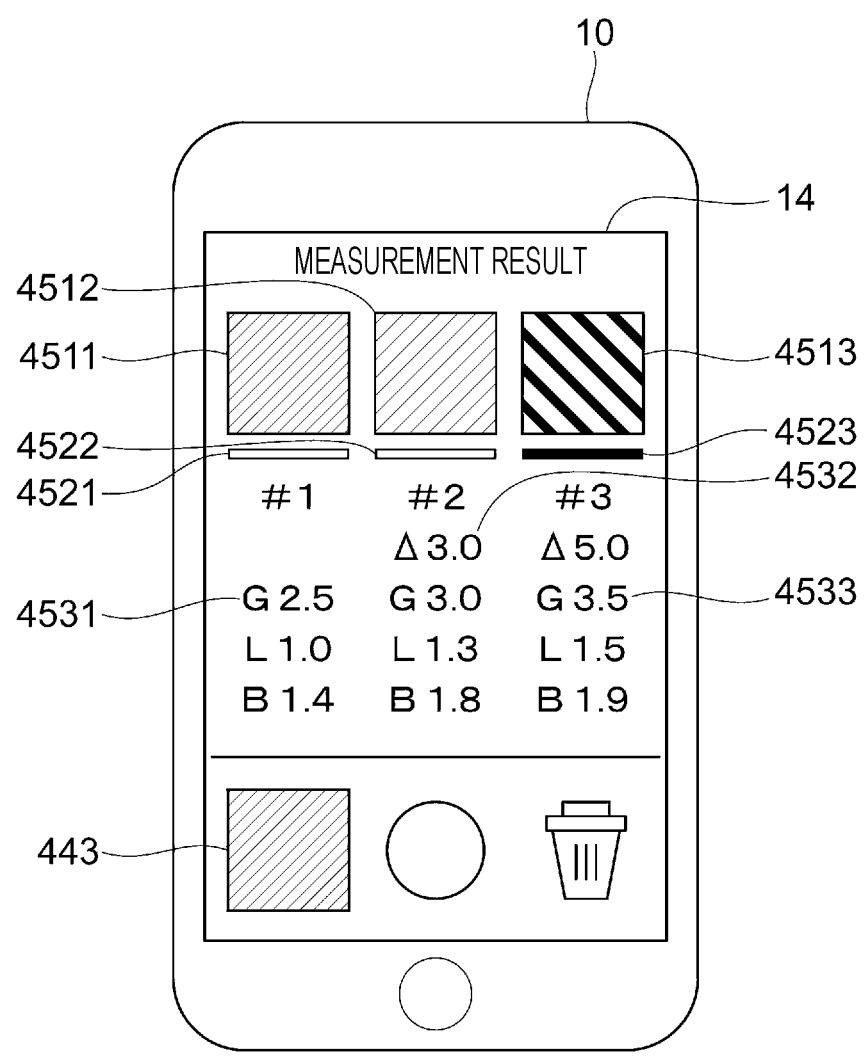
FIG. 8 illustrates an example of a screen displayed on the touch panel of the mobile terminal when the user compares partial images of the measurement target portions of the component with a reference image.

FIG. 8 illustrates an example of a screen displayed on the touch panel 14 of the mobile terminal 10 when the user compares the partial images of the measurement target portions of the component with the reference image 441. As illustrated in FIG. 8, the screen displays a partial image 4511, a mark 4521, and a measured value description 4531 about the measurement target portion #1. The screen displays a partial image 4512, a mark 4522, and a measured value description 4532 about the measurement target portion #2. The screen displays a partial image 4513, a mark 4523, and a measured value description 4533 about the measurement target portion #3. The partial images 4511 to 4513 are obtained by shooting the measurement target portions #1 to #3, respectively. The marks 4521 to 4523 are display elements indicating whether differences between the measured values of the measurement target portions #1 to #3 and the reference values fall out of a permissible range. The measured value descriptions 4531 to 4533 indicate measured values obtained by measurement on the partial images 4511 to 4513, respectively. Each of the measured value descriptions 4531 to 4533 includes a value represented by "Δ" in addition to the values of "G", "L", and "B". The symbol "Δ" represents a difference between the measured values and the reference values.

The measured value description 4533 includes a description "Δ5.0". The measured value description 4532 includes a description "Δ3.0". Both the measurement target portions #2 and #3 have differences between the measured values and the reference values, and the measurement target portion #3 has a greater difference than the measurement target portion #2. Regarding the measurement target portion #3 in which the difference between the measured values and the reference values falls out of the permissible range, the mark 4523 is emphasized.

In FIG. 8, the measured values may be compared among the plurality of measurement target portions in addition to the comparison between the measured values of each measurement target portion and the reference values.

Figure 9:
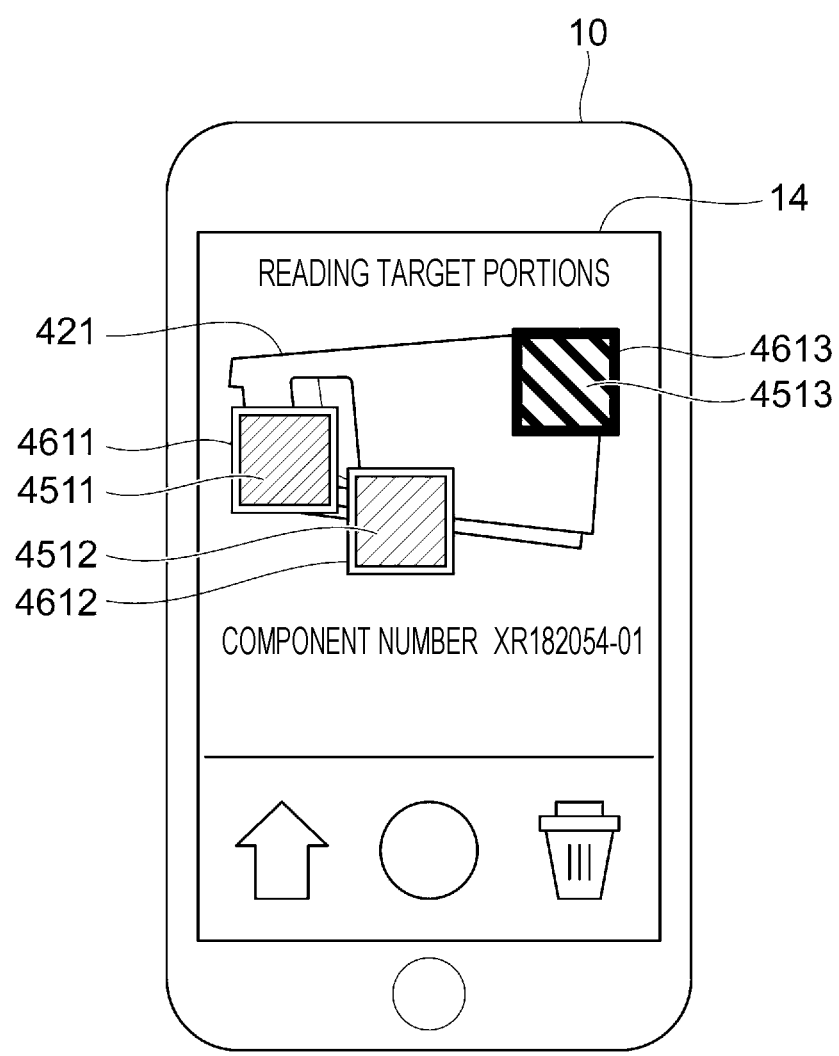
FIG. 9 illustrates an example of a screen displayed on the touch panel of the mobile terminal when the user checks the partial images on the overall image.

FIG. 9 illustrates an example of a screen displayed on the touch panel 14 of the mobile terminal 10 when the user checks the partial images 4511 to 4513 on the overall image 421. As illustrated in FIG. 9, the screen displays the partial image 4511 and a box 4611 at the measurement target portion #1 on the overall image 421. The screen displays the partial image 4512 and a box 4612 at the measurement target portion #2. The screen displays the partial image 4513 and a box 4613 at the measurement target portion #3. The boxes 4611 to 4613 are display elements indicating whether the differences between the measured values of the measurement target portions #1 to #3 and the reference values fall out of the permissible range. Regarding the measurement target portion #3 in which the difference between the measured values and the reference values falls out of the permissible range, the box 4613 is emphasized.

[Functional Configuration of Appearance Inspection Apparatus]

Figure 10:
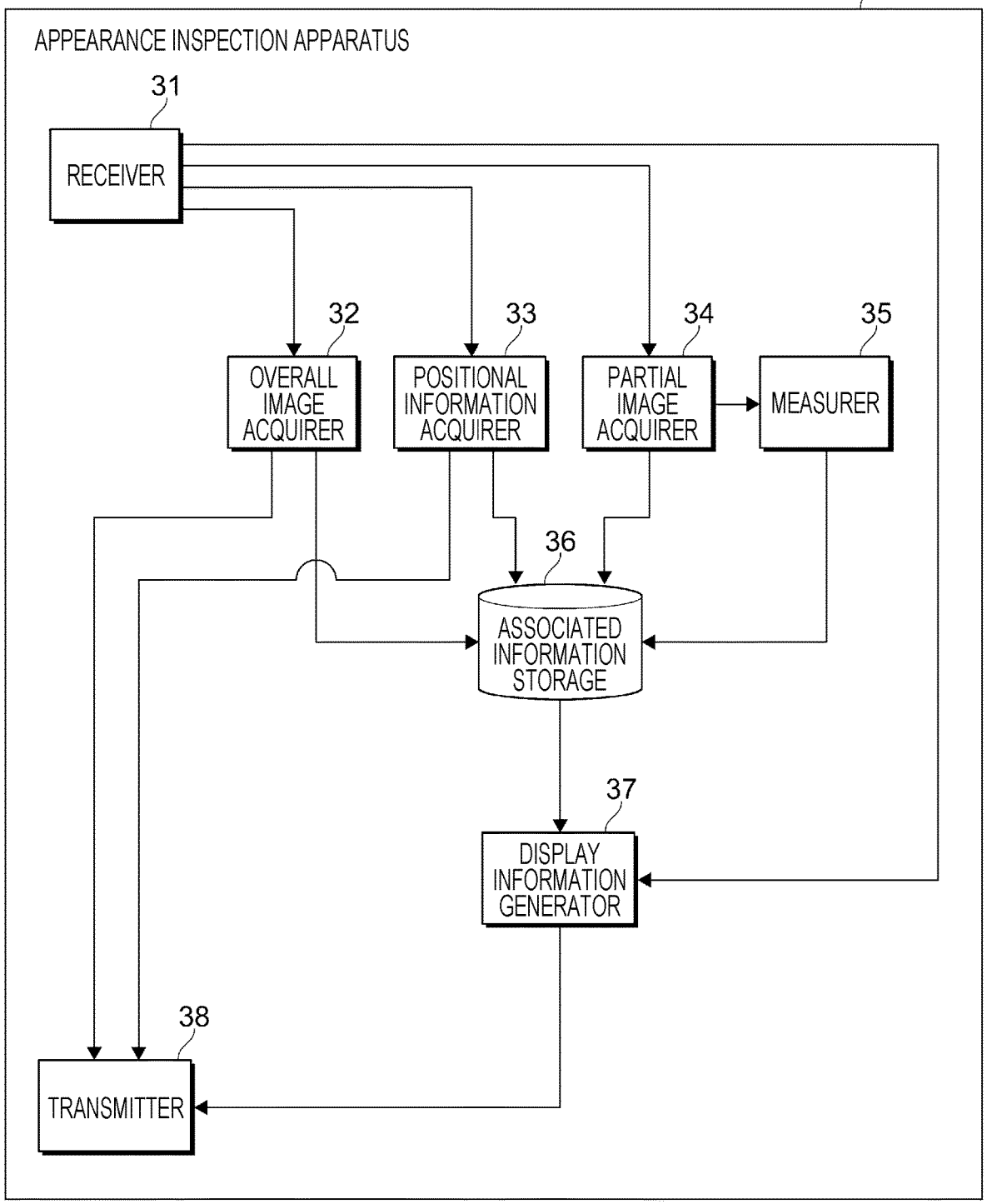
FIG. 10 is a block diagram illustrating an example of the functional configuration of the appearance inspection apparatus according to the exemplary embodiment of the present disclosure.

FIG. 10 is a block diagram illustrating an example of the functional configuration of the appearance inspection apparatus 20 according to this exemplary embodiment. As illustrated in FIG. 10, the appearance inspection apparatus 20 includes a receiver 31, an overall image acquirer 32, a positional information acquirer 33, a partial image acquirer 34, a measurer 35, an associated information storage 36, a display information generator 37, and a transmitter 38.

In the first operation, the receiver 31 receives a search key image, positional information, and a partial image from the mobile terminal 10. The search key image may be the component number image 411 illustrated in FIG. 4 or a camera image obtained by shooting the entire component. The positional information may be information indicating a position selected by the user pointing a measurement target portion on an overall image displayed on the touch panel 14 of the mobile terminal 10. The positional information may also be information indicating a position selected by the user gazing at a measurement target portion of the component with an eye camera or the like. The partial image is a camera image obtained by shooting the selected measurement target portion. The receiver 31 transfers the search key image to the overall image acquirer 32, the positional information to the positional information acquirer 33, and the partial image to the partial image acquirer 34.

In the second operation, the receiver 31 receives an overall image, positional information, and a partial image from the mobile terminal 10. The overall image is a camera image obtained by shooting the entire component. The positional information is information indicating a position selected by gradually zooming on a measurement target portion after shooting and positioning the entire component. The partial image is a camera image obtained by gradually zooming on the measurement target portion after shooting and positioning the entire component. The receiver 31 transfers the overall image to the overall image acquirer 32, the positional information to the positional information acquirer 33, and the partial image to the partial image acquirer 34.

In the third operation, the receiver 31 receives a search key image and a partial image from the mobile terminal 10. The search key image may be the component number image 411 illustrated in FIG. 4 or a camera image obtained by shooting the entire component. The partial image is a camera image obtained by shooting a measurement target portion selected by the appearance inspection apparatus 20 in the component. The receiver 31 transfers the search key image to the overall image acquirer 32 and the partial image to the partial image acquirer 34.

In the first operation, the overall image acquirer 32 acquires an overall image from a database (not illustrated) based on the search key image received by the receiver 31. Specifically, the overall image acquirer 32 receives a component number image from the receiver 31 as the search key image, and acquires an overall image registered in the database in association with a component number obtained from the component number image. The overall image acquirer 32 may receive a camera image from the receiver 31 as the search key image, and acquire an overall image registered in the database by pattern matching with the camera image. The overall image may be a CAD drawing or a photograph of the entire component. The overall image acquirer 32 stores the overall image in the associated information storage 36, and transfers the overall image to the transmitter 38.

In the second operation, the overall image acquirer 32 acquires the overall image received by the receiver 31. As described above, the overall image is a camera image obtained by shooting the entire component, that is, a photograph of the entire component. The overall image acquirer 32 stores the overall image in the associated information storage 36.

In the third operation, the overall image acquirer 32 acquires an overall image from the database (not illustrated) based on the search key image received by the receiver 31. Specifically, the overall image acquirer 32 receives a component number image from the receiver 31 as the search key image, and acquires an overall image registered in the database in association with a component number obtained from the component number image. The overall image acquirer 32 may receive a camera image from the receiver 31 as the search key image, and acquire an overall image registered in the database by pattern matching with the camera image. The overall image may be a CAD drawing or a photograph of the entire component. The overall image acquirer 32 stores the overall image in the associated information storage 36, and transfers the overall image to the transmitter 38.

In the first operation, the positional information acquirer 33 acquires the positional information received by the receiver 31. As described above, the positional information may be information indicating a position selected by the user pointing a measurement target portion on an overall image displayed on the touch panel 14 of the mobile terminal 10. The positional information may also be information indicating a position selected by the user gazing at a measurement target portion of the component with an eye camera or the like. The positional information acquirer 33 stores the positional information in the associated information storage 36 in association with the overall image, and transfers the positional information to the transmitter 38. In this exemplary embodiment, the positional information acquirer 33 performs this process as an example of acquiring the positional information indicating the position of the portion of the article. In this exemplary embodiment, the position selected by the user pointing the measurement target portion on the overall image displayed on the touch panel 14 of the mobile terminal 10 is used as an example of the position of the portion specified on the overall image of the article and the position of the portion specified by selecting the position on the overall image displayed on the display.

In the second operation, the positional information acquirer 33 acquires the positional information received by the receiver 31. As described above, the positional information is information indicating a position selected by gradually zooming on a measurement target portion after shooting and positioning the entire component. The positional information acquirer 33 stores the positional information in the associated information storage 36 in association with the overall image. In this exemplary embodiment, the positional information acquirer 33 performs this process as an example of acquiring the positional information indicating the position of the portion of the article. In this exemplary embodiment, the position selected by gradually zooming on the measurement target portion after shooting and positioning the entire component is used as an example of the position of the portion specified on the overall image of the article and the position of the portion specified by zooming on the position with the imaging device shooting the overall image.

In the third operation, the positional information acquirer 33 acquires positional information generated by itself. Specifically, the positional information acquirer 33 may generate the positional information based on information related to manufacture of the component. Examples of the information related to the manufacture of the component include information related to records of a manufacturing process for the component. This is because a portion of the component that is likely to have a texture problem or a defect is identifiable from the information related to the records of the manufacturing process for the component. The positional information acquirer 33 stores the positional information in the associated information storage 36 in association with the overall image, and transfers the positional information to the transmitter 38. In this exemplary embodiment, the positional information acquirer 33 performs this process as an example of acquiring the positional information indicating the position of the portion of the article.

The partial image acquirer 34 acquires the partial image received by the receiver 31. In the first operation, the partial image is, as described above, a camera image obtained by shooting a measurement target portion selected by the user in the component. In the second operation, the partial image is, as described above, a camera image obtained by gradually zooming on a measurement target portion after shooting and positioning the entire component. In the third operation, the partial image is, as described above, a camera image obtained by shooting a measurement target portion selected by the appearance inspection apparatus 20 in the component. The partial image acquirer 34 registers the partial image in the associated information storage 36 in association with the overall image and the positional information.

The measurer 35 performs measurement from predetermined viewpoints based on the partial image acquired by the partial image acquirer 34. Measured values obtained through the measurement are stored in the associated information storage 36 in association with the overall image, the positional information, and the partial image. In this exemplary embodiment, the measured values are used as an example of the condition information indicating the condition of the portion of the article, and the measurer 35 performs this process as an example of acquiring the condition information. In this exemplary embodiment, the measured values are used as an example of a measurement result related to the condition of the portion.

The associated information storage 36 stores associated information in which the overall image acquired by the overall image acquirer 32, the positional information acquired by the positional information acquirer 33, the partial image acquired by the partial image acquirer 34, and the measured values obtained through the measurement performed by the measurer 35 are associated with one another. In this exemplary embodiment, the associated information storage 36 performs the storage process as an example of storing the positional information and the condition information in association with each other. Details of the associated information are described later.

The display information generator 37 generates display information to be used for displaying a screen on the mobile terminal 10 based on the associated information stored in the associated information storage 36. Examples of the screen include, but not limited to, the screen illustrated in FIG. 8 or FIG. 9.

Specifically, the display information generator 37 displays the partial image and the measured values of each measurement target portion in association with each other on the screen of FIG. 8. The association of the partial image and the measured values may be any method for showing a relationship between the partial image and the measured values. For example, the measured values may be popped up in response to movement of a mouse cursor onto the partial image. In this case, the process performed by the display information generator 37 is an example of controlling the display to display an image showing the portion of the article in association with the condition information. On the screen of FIG. 8, the display information generator 37 displays, for each measurement target portion, the measured values in association with the mark indicating whether the difference between the measured values and the reference values falls within the permissible range. The mark is displayed under the partial image, but any representation is applicable as long as the representation is associated with the partial image. For example, a box may be displayed around the partial image as illustrated in FIG. 9 in place of the mark. In this case, the mark is an example of a display element indicating whether the measurement result falls within a permissible range, and the process performed by the display information generator 37 is an example of controlling the display to display the display element in association with the measurement result. On the screen of FIG. 8, the display information generator 37 may display combinations of the partial image, the measured values, and the mark in order of the values of the differences between the measured values and the reference values, or in order based on the positions of the measurement target portions. In the latter case, the process performed by the display information generator 37 is an example of controlling the display to display pieces of the condition information in order based on the positions indicated by pieces of the positional information. In summary, the display information generator 37 of this exemplary embodiment performs its process as an example of controlling the display to display the condition information based on the positional information.

On the screen of FIG. 9, the display information generator 37 displays the partial image at the measurement target portion on the overall image. On the screen of FIG. 9, the display information generator 37 displays, around the partial image on the overall image, a thick-line box indicating whether the difference between the measured values and the reference values falls within the permissible range. The thick-line box encloses the partial image, but any representation is applicable as long as the representation is associated with the partial image. For example, a mark may be displayed under the partial image as illustrated in FIG. 8 in place of the thick-line box. In this case, the thick-line box is an example of the display element indicating whether the measurement result falls within the permissible range, and the process performed by the display information generator 37 is an example of controlling the display to display the display element in association with the measurement result. On the screen of FIG. 9, the display information generator 37 may display the measured values in association with the partial image on the overall image. In this case, the process performed by the display information generator 37 is an example of controlling the display to display the condition information at the position indicated by the positional information on the overall image of the article. In summary, the display information generator 37 of this exemplary embodiment performs its process as an example of controlling the display to display the condition information based on the positional information.

In the first operation, the transmitter 38 transmits the overall image acquired by the overall image acquirer 32 and the positional information acquired by the positional information acquirer 33 to the mobile terminal 10. The touch panel 14 of the mobile terminal 10 displays a screen showing the measurement target portion selected by the user on the overall image. If the user specifies a position by pointing the position on the overall image displayed on the mobile terminal 10, the position may be displayed on the overall image on the mobile terminal 10 and the transmitter 38 need not transmit the positional information. The transmitter 38 also transmits the display information generated by the display information generator 37 to the mobile terminal 10. For example, the touch panel 14 of the mobile terminal 10 displays the screen illustrated in FIG. 8 or FIG. 9.

In the second operation, the transmitter 38 transmits the display information generated by the display information generator 37 to the mobile terminal 10. For example, the touch panel 14 of the mobile terminal 10 displays the screen illustrated in FIG. 8 or FIG. 9.

In the third operation, the transmitter 38 transmits the overall image acquired by the overall image acquirer 32 and the positional information acquired by the positional information acquirer 33 to the mobile terminal 10. The touch panel 14 of the mobile terminal 10 displays a screen showing the measurement target portion selected by the appearance inspection apparatus 20 on the overall image. In this exemplary embodiment, the transmitter 38 performs this process as an example of controlling the display to display the position of the portion on the overall image of the article after the acquisition of the positional information. The transmitter 38 also transmits the display information generated by the display information generator 37 to the mobile terminal 10. For example, the touch panel 14 of the mobile terminal 10 displays the screen illustrated in FIG. 8 or FIG. 9.

Description is made of the associated information stored in the associated information storage 36. FIG. 11 illustrates an example of the associated information. Although the associated information is illustrated in a table format, the associated information may be provided in a different format.

As illustrated in FIG. 11, the associated information includes fields for the overall image, the positional information, the partial image, and the measured values. Regarding a measurement target portion at a position indicated by positional information (X11, Y11) on an overall image P1, the partial image is Q11 and the measured values are 2.5 for "G", 1.0 for "L", and 1.4 for "B", indicating that there is no difference from the reference values. Regarding a measurement target portion at a position indicated by positional information (X12, Y12) on the overall image P1, the partial image is Q12 and the measured values are 3.0 for "G", 1.3 for "L", and 1.8 for "B", indicating that the difference from the reference values is 3.0. Regarding a measurement target portion at a position indicated by positional information (X13, Y13) on the overall image P1, the partial image is Q13 and the measured values are 3.5 for "G", 1.5 for "L", and 1.9 for "B", indicating that the difference from the reference values is 5.0.

In FIG. 11, the overall image is represented by a symbol. This symbol may be regarded as the overall image itself or as information on a link to a place where the overall image is stored. For example, the positional information may be determined in a rectangular area including the overall image in such a manner that the upper left corner is the origin, an X axis extends in a lateral direction, and a Y axis extends in a vertical direction. In FIG. 11, the partial image is also represented by a symbol. This symbol may be regarded as the partial image itself or as information on a link to a place where the partial image is stored. Regarding the measured values, the symbol "G" represents the index of gloss, the symbol "L" represents the index of lightness, and the symbol "B" represents the index of irregularities as described above.

[First Operation of Appearance Inspection Apparatus]

Figure 12:
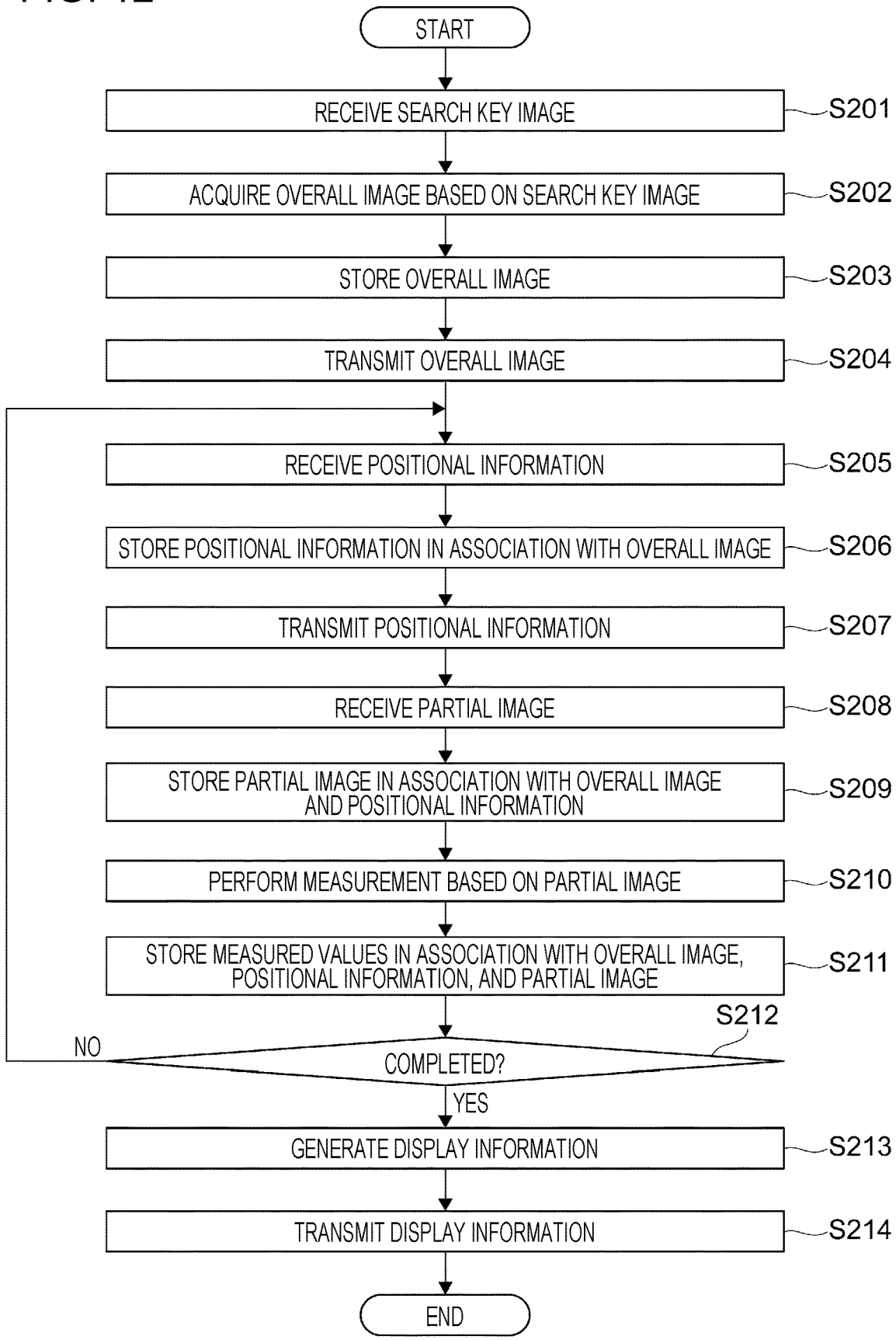
FIG. 12 is a flowchart illustrating an example of a first operation of the appearance inspection apparatus according to the exemplary embodiment of the present disclosure.

FIG. 12 is a flowchart illustrating an example of the first operation of the appearance inspection apparatus 20 according to this exemplary embodiment.

In the appearance inspection apparatus 20, the receiver 31 receives a search key image (Step 201). Examples of the search key image include a component number image obtained by shooting a component number, and a camera image obtained by shooting the entire component. The overall image acquirer 32 acquires an overall image from the database based on the search key image received in Step 201 (Step 202). For example, if the search key image is the component number image, the overall image acquirer 32 reads the overall image by using the component number as a search key. If the search key image is the camera image obtained by shooting the entire component, the overall image acquirer 32 reads the overall image by pattern matching with the camera image. Examples of the overall image include a CAD drawing and a photograph of the entire component. The overall image acquirer 32 stores the overall image acquired in Step 202 in the associated information storage 36 (Step 203). The transmitter 38 transmits the overall image acquired in Step 202 to the mobile terminal 10 (Step 204). The mobile terminal 10 displays the overall image.

In the appearance inspection apparatus 20, the receiver 31 receives positional information (Step 205). Examples of the positional information include information indicating a position pointed by the user on the overall image displayed on the mobile terminal 10, and information indicating a position that the user is gazing at with an eye camera or the like. The positional information acquirer 33 stores the positional information received in Step 205 in the associated information storage 36 in association with the overall image (Step 206). The transmitter 38 transmits the positional information received in Step 205 to the mobile terminal 10 (Step 207). The mobile terminal 10 displays a position of a measurement target portion on the overall image. If the user specifies a position by pointing the position on the overall image displayed on the mobile terminal 10, the position may be displayed on the overall image on the mobile terminal 10 and the process of Step 207 need not be performed.

In the appearance inspection apparatus 20, the receiver 31 receives a partial image (Step 208). Examples of the partial image include a camera image obtained by shooting a portion of the component corresponding to the position displayed on the overall image based on the positional information transmitted in Step 207. The partial image acquirer 34 stores the partial image received in Step 208 in the associated information storage 36 in association with the overall image and the positional information (Step 209). The measurer 35 performs measurement based on the partial image received in Step 208 (Step 210), and stores measured values obtained through the measurement in association with the overall image, the positional information, and the partial image (Step 211).

The receiver 31 determines whether reception of positional information and a partial image has been completed (Step 212). For example, the receiver 31 may make the determination based on whether neither positional information nor a partial image is received for a period exceeding a threshold, or whether information indicating completion of transmission of positional information and a partial image is received from the mobile terminal 10.

If the receiver 31 does not determine, in Step 212, that reception of positional information and a partial image has been completed, the receiver 31 returns the process to Step 205. The receiver 31, the positional information acquirer 33, the partial image acquirer 34, the measurer 35, and the transmitter 38 repeat the processes of Steps 205 to 211.

If the receiver 31 determines, in Step 212, that reception of positional information and a partial image has been completed, the display information generator 37 generates display information (Step 213). The transmitter 38 transmits the display information generated in Step 213 to the mobile terminal 10 (Step 214). For example, the mobile terminal 10 displays the screen illustrated in FIG. 8 or FIG. 9.

[Second Operation of Appearance Inspection Apparatus]

Figure 13:
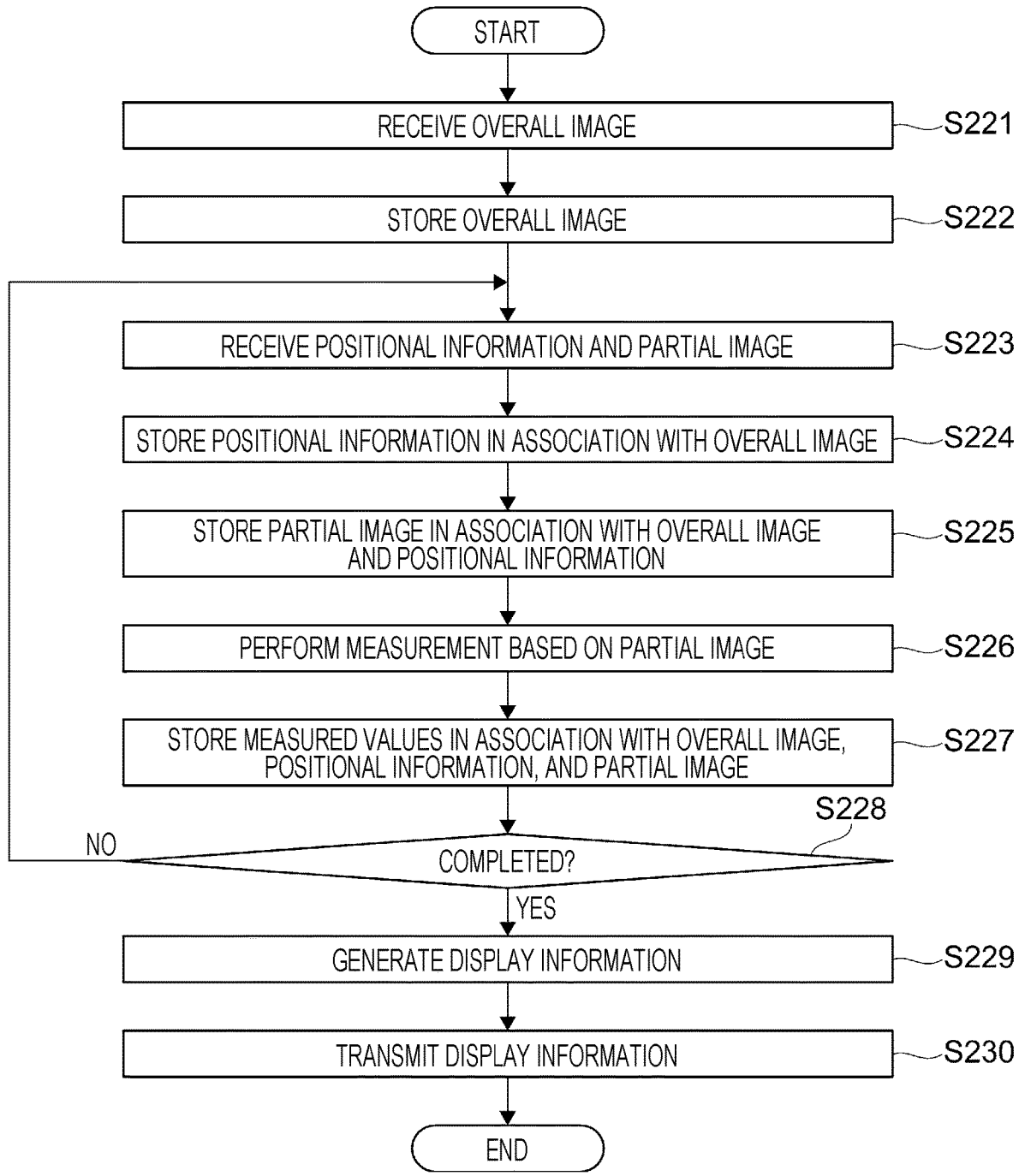
FIG. 13 is a flowchart illustrating an example of a second operation of the appearance inspection apparatus according to the exemplary embodiment of the present disclosure.

FIG. 13 is a flowchart illustrating an example of the second operation of the appearance inspection apparatus 20 according to this exemplary embodiment.

In the appearance inspection apparatus 20, the receiver 31 receives an overall image (Step 221). Examples of the overall image include a camera image obtained by shooting the entire component. The overall image acquirer 32 stores the overall image received in Step 221 in the associated information storage 36 (Step 222).

In the appearance inspection apparatus 20, the receiver 31 receives positional information and a partial image (Step 223). Examples of the positional information include information indicating a position selected by gradually zooming on a measurement target portion after shooting and positioning the entire component. Examples of the partial image include a camera image obtained by gradually zooming on the measurement target portion after shooting and positioning the entire component. The positional information acquirer 33 stores the positional information received in Step 223 in the associated information storage 36 in association with the overall image (Step 224). The partial image acquirer 34 stores the partial image received in Step 223 in the associated information storage 36 in association with the overall image and the positional information (Step 225). The measurer 35 performs measurement based on the partial image received in Step 223 (Step 226), and stores measured values obtained through the measurement in association with the overall image, the positional information, and the partial image (Step 227).

The receiver 31 determines whether reception of positional information and a partial image has been completed (Step 228). For example, the receiver 31 may make the determination based on whether neither positional information nor a partial image is received for a period exceeding the threshold, or whether information indicating completion of transmission of positional information and a partial image is received from the mobile terminal 10.

If the receiver 31 does not determine, in Step 228, that reception of positional information and a partial image has been completed, the receiver 31 returns the process to Step 223. The receiver 31, the positional information acquirer 33, the partial image acquirer 34, and the measurer 35 repeat the processes of Steps 223 to 227.

If the receiver 31 determines, in Step 228, that reception of positional information and a partial image has been completed, the display information generator 37 generates display information (Step 229). The transmitter 38 transmits the display information generated in Step 229 to the mobile terminal 10 (Step 230). For example, the mobile terminal 10 displays the screen illustrated in FIG. 8 or FIG. 9.

[Third Operation of Appearance Inspection Apparatus]

Figure 14:
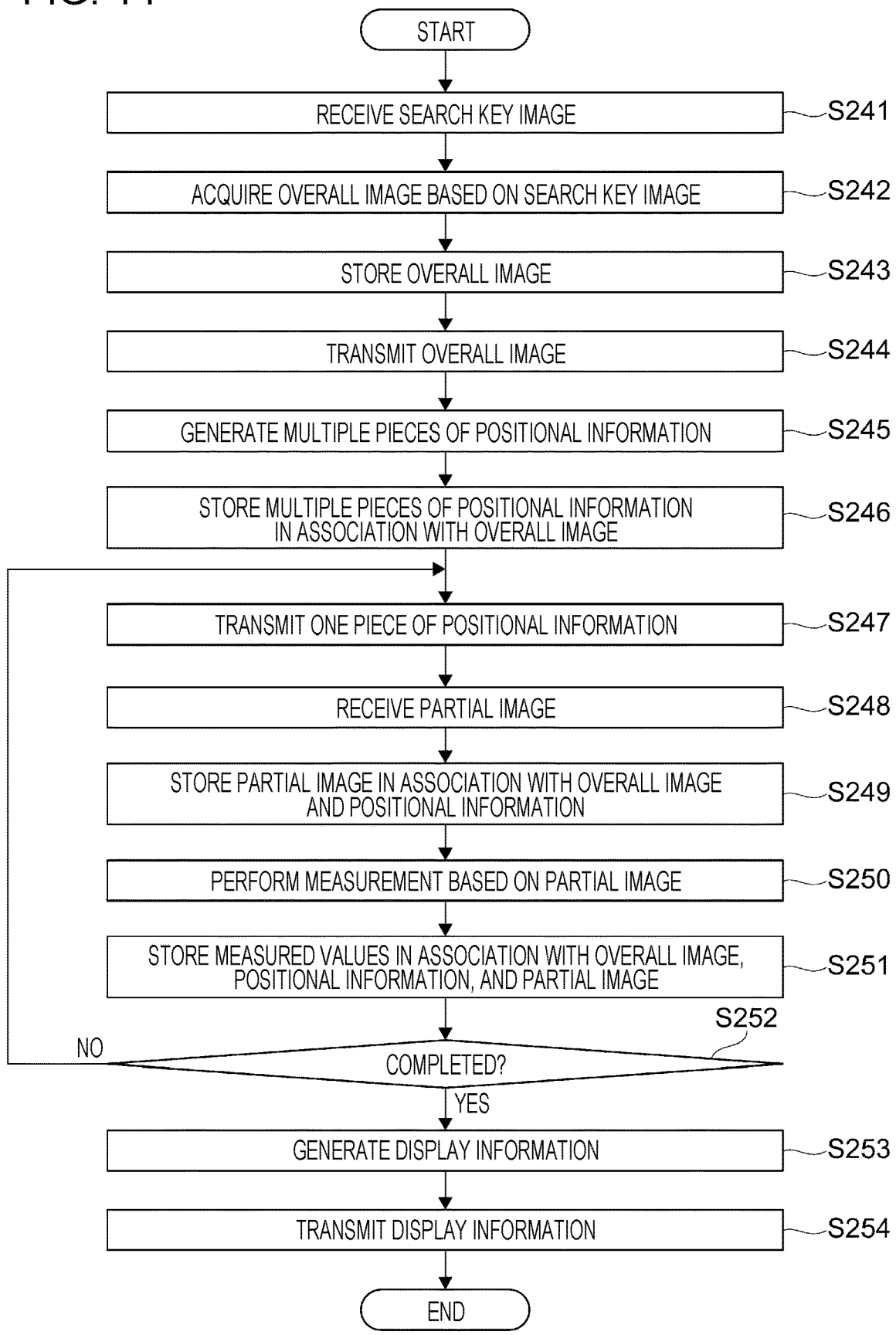
FIG. 14 is a flowchart illustrating an example of a third operation of the appearance inspection apparatus according to the exemplary embodiment of the present disclosure.

FIG. 14 is a flowchart illustrating an example of the third operation of the appearance inspection apparatus 20 according to this exemplary embodiment.

In the appearance inspection apparatus 20, the receiver 31 receives a search key image (Step 241). Examples of the search key image include a component number image obtained by shooting a component number, and a camera image obtained by shooting the entire component. The overall image acquirer 32 acquires an overall image from the database based on the search key image received in Step 241 (Step 242). For example, if the search key image is the component number image, the overall image acquirer 32 reads the overall image by using the component number as a search key. If the search key image is the camera image obtained by shooting the entire component, the overall image acquirer 32 reads the overall image by pattern matching with the camera image. Examples of the overall image include a CAD drawing and a photograph of the entire component. The overall image acquirer 32 stores the overall image acquired in Step 242 in the associated information storage 36 (Step 243). The transmitter 38 transmits the overall image acquired in Step 242 to the mobile terminal 10 (Step 244). The mobile terminal 10 displays the overall image.

In the appearance inspection apparatus 20, the positional information acquirer 33 generates multiple pieces of positional information (Step 245). For example, the positional information acquirer 33 may generate the multiple pieces of positional information based on information related to manufacture of the component. The positional information acquirer 33 stores the multiple pieces of positional information generated in Step 245 in the associated information storage 36 in association with the overall image (Step 246). The transmitter 38 transmits one piece of untransmitted positional information to the mobile terminal 10 among the multiple pieces of positional information generated in Step 245 (Step 247). The mobile terminal 10 displays a position of a measurement target portion on the overall image.

In the appearance inspection apparatus 20, the receiver 31 receives a partial image (Step 248). Examples of the partial image include a camera image obtained by shooting a portion of the component corresponding to the position displayed on the overall image based on the positional information transmitted in Step 247. The partial image acquirer 34 stores the partial image received in Step 248 in the associated information storage 36 in association with the overall image and the positional information (Step 249). The measurer 35 performs measurement based on the partial image received in Step 248 (Step 250), and stores measured values obtained through the measurement in association with the overall image, the positional information, and the partial image (Step 251).

The transmitter 38 determines whether transmission of positional information has been completed (Step 252). For example, the transmitter 38 may make the determination based on whether untransmitted positional information is no longer present in the multiple pieces of positional information generated in Step 245.

If the transmitter 38 does not determine, in Step 252, that transmission of positional information has been completed, the transmitter 38 returns the process to Step 247. The receiver 31, the partial image acquirer 34, the measurer 35, and the transmitter 38 repeat the processes of Steps 247 to 251.

If the transmitter 38 determines, in Step 252, that transmission of positional information has been completed, the display information generator 37 generates display information (Step 253). The transmitter 38 transmits the display information generated in Step 253 to the mobile terminal 10 (Step 254). For example, the mobile terminal 10 displays the screen illustrated in FIG. 8 or FIG. 9.

[Processor]

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

[Program]

The processes performed by the appearance inspection apparatus 20 according to this exemplary embodiment are prepared as a program such as application software.

That is, the program that implements this exemplary embodiment is regarded as a program causing a computer to implement the functions of acquiring positional information indicating a position of a portion of an article, acquiring condition information indicating a condition of the portion of the article, and storing the positional information and the condition information in association with each other.

The program that implements this exemplary embodiment may be provided by using a communicator or by being stored in a recording medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to:
    acquire an overall image of an article;
    acquire positional information indicating a position of a portion of the article in reference to the overall image of the article, the portion being smaller than an entirety of the article;
    acquire condition information indicating a condition of the portion of the article, the condition information including a camera-captured image of the portion of the article and a value measured from the camera-captured image;
    store the positional information and the condition information in association with each other; and
    cause the overall image of the article to be displayed on a display with at least a part of the acquired condition information overlaid on the overall image at the position.

2. The information processing apparatus according to claim 1, wherein the position of the portion is specified on the overall image of the article.

3. The information processing apparatus according to claim 2, wherein the position of the portion is specified by selecting the position on the overall image displayed on the display.

4. The information processing apparatus according to claim 2, wherein the position of the portion is specified by zooming on the position with an imaging device shooting the overall image.

5. The information processing apparatus according to claim 1, wherein the processor is configured to control the display to display the position of the portion on the overall image of the article after acquisition of the positional information.

6. The information processing apparatus according to claim 5, wherein the positional information is acquired based on information related to manufacture of the article.

7. The information processing apparatus according to claim 1, wherein the processor is configured to control the display to display the condition information based on the positional information.

8. The information processing apparatus according to claim 7, wherein the processor is configured to control the display to display multiple pieces of the condition information in order based on positions indicated by multiple pieces of the positional information.

9. The information processing apparatus according to claim 7, wherein the processor is configured to control the display to display the condition information at the position indicated by the positional information on the overall image of the article.

10. The information processing apparatus according to claim 7, wherein the processor is configured to control the display to further display an image showing the portion of the article in association with the condition information.

11. The information processing apparatus according to claim 7, wherein the condition information includes a measurement result related to the condition of the portion.

12. The information processing apparatus according to claim 11, wherein the processor is configured to control the display to further display, in association with the measurement result, a display element indicating whether the measurement result falls within a permissible range.

13. A non-transitory computer readable medium storing a program causing a computer to execute a process comprising:
    acquiring an overall image of an article;
    acquiring positional information indicating a position of a portion of the article in reference to the overall image of the article, the portion being smaller than an entirety of the article;
    acquiring condition information indicating a condition of the portion of the article, the condition information including a camera-captured image of the portion of the article and a value measured from the camera-captured image;
    storing the positional information and the condition information in association with each other; and
    causing the overall image of the article to be displayed on a display with at least a part of the acquired condition information overlaid on the overall image at the position.

14. An information processing method comprising:
    acquiring an overall image of an article;
    acquiring positional information indicating a position of a portion of the article in reference to the overall image of the article, the portion being smaller than an entirety of the article;
    acquiring condition information indicating a condition of the portion of the article, the condition information including a camera-captured image of the portion of the article and a value measured from the camera-captured image;
    storing the positional information and the condition information in association with each other; and
    causing the overall image of the article to be displayed on a display with at least a part of the acquired condition information overlaid on the overall image at the position.

* * * * *